(12) United States Patent
Krause

(10) Patent No.: US 10,320,167 B2
(45) Date of Patent: Jun. 11, 2019

(54) CONDUIT STUB-UP ASSEMBLY

(71) Applicant: CSUE Technologies, Inc., Niles, IL (US)

(72) Inventor: Jeffrey Krause, Niles, IL (US)

(73) Assignee: CSUE Technologies, Inc., Niles, IL (US)

( * ) Notice: Subject to any disclaimer, the term of this patent is extended or adjusted under 35 U.S.C. 154(b) by 766 days.

(21) Appl. No.: 14/865,893

(22) Filed: Sep. 25, 2015

(65) Prior Publication Data

US 2016/0190783 A1     Jun. 30, 2016

Related U.S. Application Data

(63) Continuation-in-part of application No. 14/244,938, filed on Apr. 4, 2014.

(60) Provisional application No. 62/130,881, filed on Mar. 10, 2015, provisional application No. 62/055,013, filed on Sep. 25, 2014, provisional application No. 61/800,285, filed on Mar. 15, 2013.

(51) Int. Cl.
    *H02G 3/04*         (2006.01)
    *H02G 9/06*         (2006.01)

(52) U.S. Cl.
    CPC .......... *H02G 3/0481* (2013.01); *H02G 3/0493* (2013.01); *H02G 9/06* (2013.01)

(58) Field of Classification Search
    CPC ....... H02G 3/0481; H02G 3/0493; H02G 9/06
    See application file for complete search history.

(56) References Cited

U.S. PATENT DOCUMENTS

| | | |
|---|---|---|
| 4,073,514 A | 2/1978 | Pate |
| 6,765,143 B2 | 7/2004 | Kiely |
| 7,841,630 B1 | 11/2010 | Auray et al. |
| 8,274,000 B2 | 9/2012 | Smith |
| 8,474,877 B2 | 7/2013 | Smith |
| 8,487,197 B2 | 7/2013 | Smith |
| 2007/0126231 A1* | 6/2007 | Thompson .............. F16L 19/08 285/249 |
| 2009/0032281 A1* | 2/2009 | Turcovsky ............ E04G 15/061 174/83 |

\* cited by examiner

*Primary Examiner* — Ryan J. Walters
(74) *Attorney, Agent, or Firm* — Wood, Phillips, Katz, Clark & Mortimer

(57) ABSTRACT

A conduit stub-up assembly as disclosed herein comprises a conduit connector comprising a connector body including first and second openings for selectively receiving conduit end portions. The second opening has a threading element and is of a select diameter corresponding to a size of conduit end portions. A conduit stub-up form comprises an elongate tubular wall having a shoulder connected to a narrowed cylindrical neck closed at a distal end. The elongate tubular wall is of a diameter greater than the select diameter and the neck has a size to be removably received in the second opening and being engagable by the threading element.

7 Claims, 11 Drawing Sheets

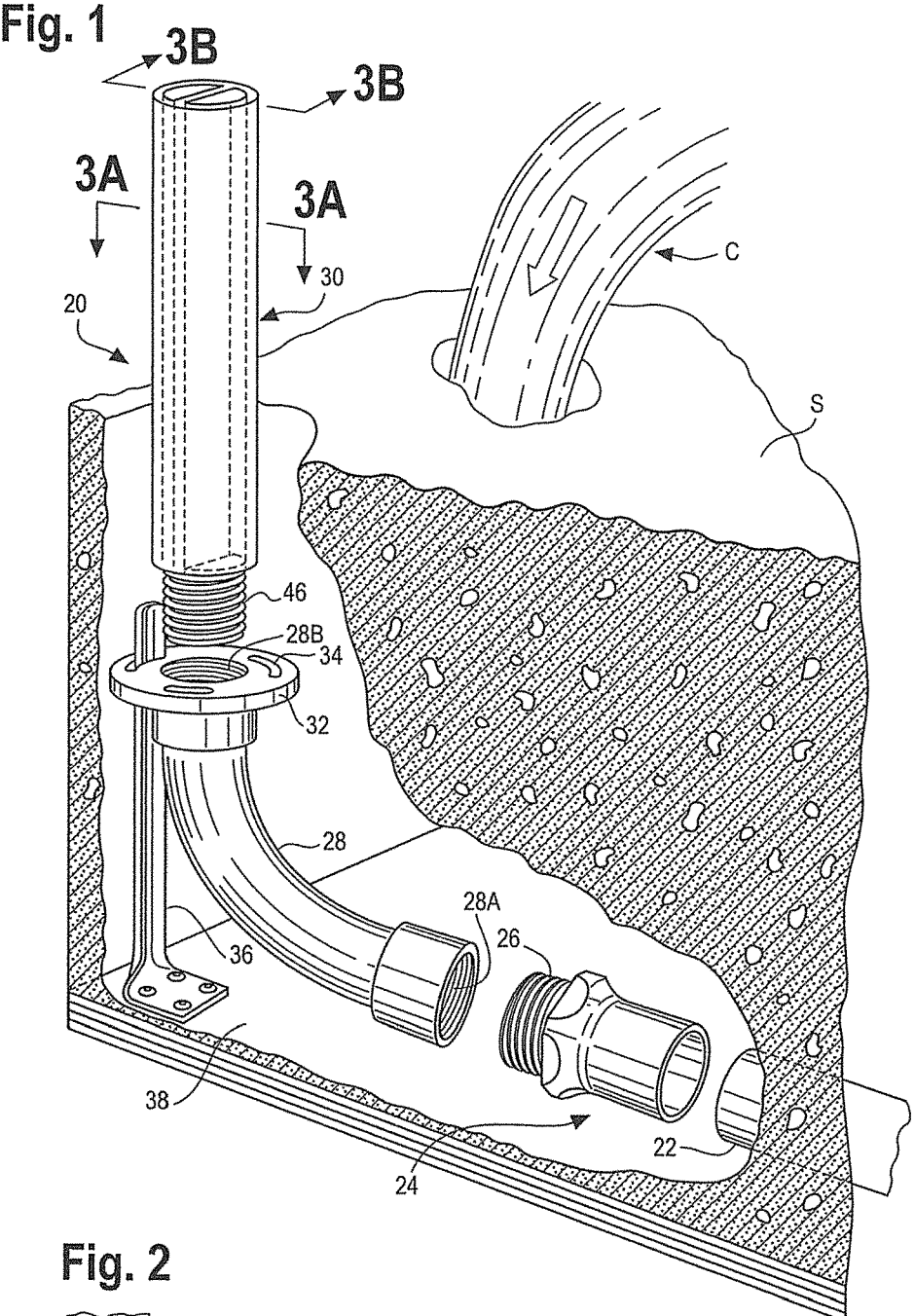
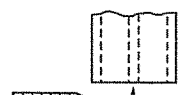
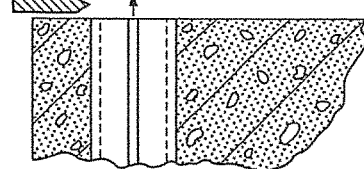
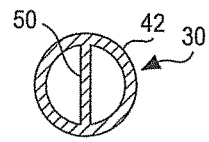

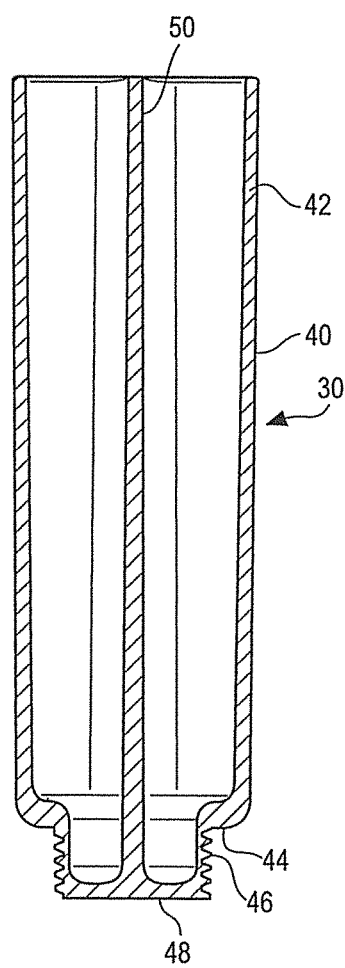

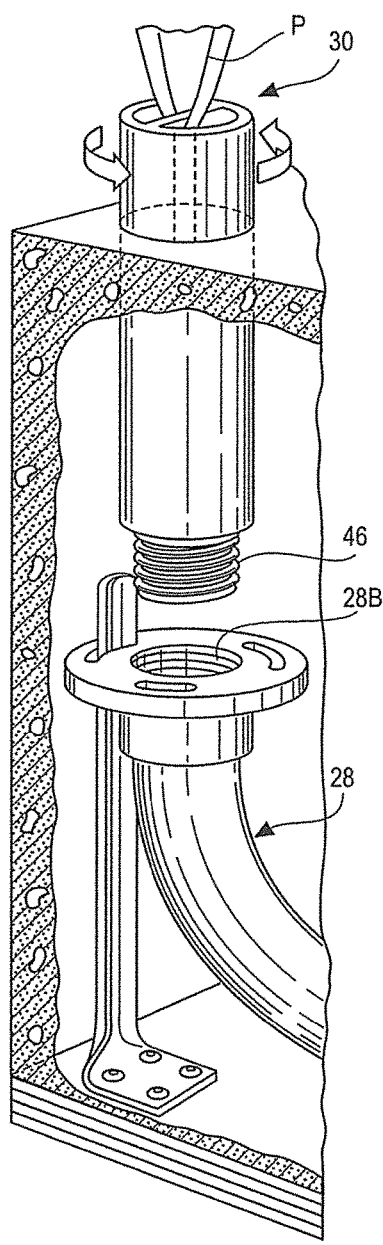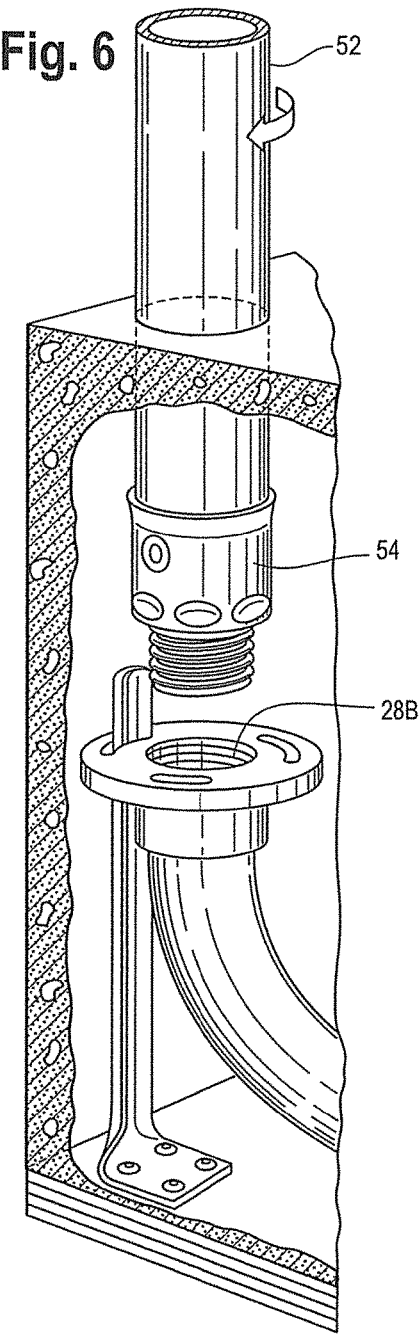

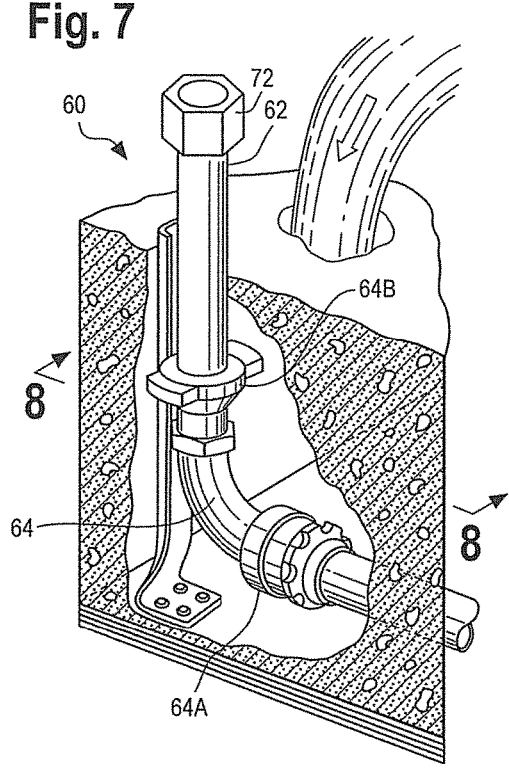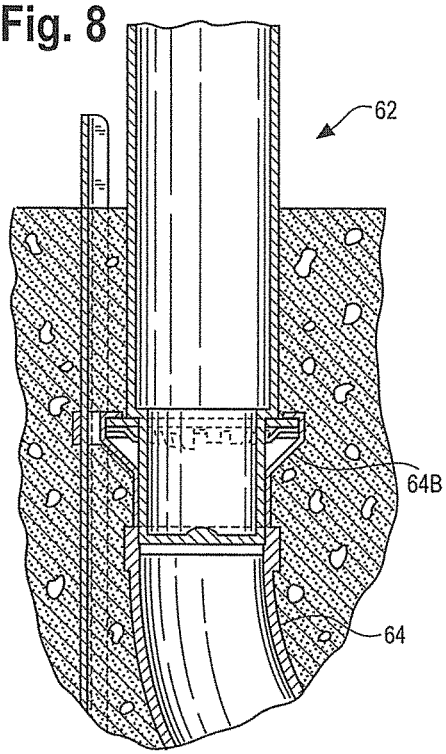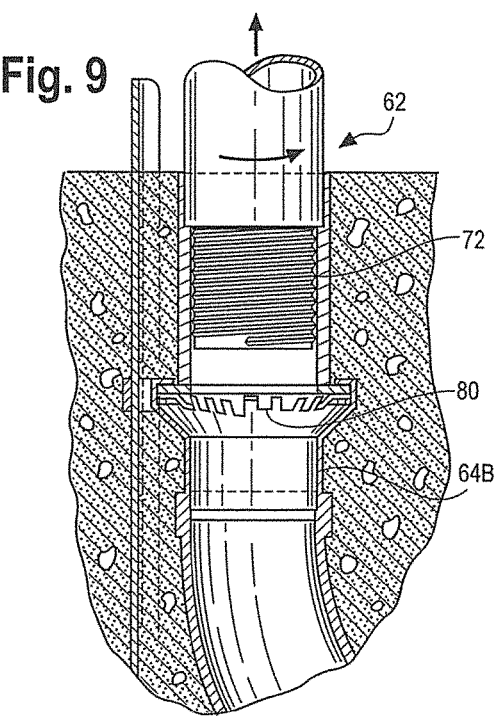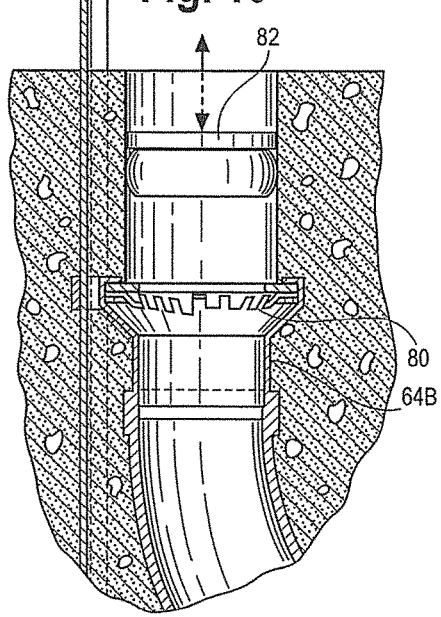

CONDUIT STUB-UP ASSEMBLY

CROSS-REFERENCE TO RELATED APPLICATIONS

The present application claims the benefit of U.S. provisional patent application Ser. No. 62/055,013, filed on Sep. 25, 2014, and U.S. provisional patent application Ser. No. 62/130,881, filed on Mar. 10, 2015 and is a continuation-in-part of U.S. application Ser. No. 14/244,938, filed Apr. 4, 2014, which claims the benefit of provisional Application No. 61/808,785, filed on Apr. 5, 2013.

FEDERALLY SPONSORED RESEARCH OR DEVELOPMENT

Not Applicable.

MICROFICHE/COPYRIGHT REFERENCE

Not Applicable.

FIELD OF THE INVENTION

The present disclosure generally relates to electrical conduit connections, and more particularly pertains to assemblies and methods suitable for in-slab conduit connections.

BACKGROUND

In slab-on-grade, suspended slab concrete structures and slab-on-metal deck construction it is often a standard practice to install electrical conduit raceways within the body of the concrete slab. In order to be able to continue the conduit raceway vertically after concrete placement, the conduit is left extending above the top of slab approximately, for example, six to twelve inches above the top of the slab, to allow the in-slab conduit to be coupled to the future extension of the raceway. This section of conduit extending above the final slab elevation is commonly referred to as a "conduit stub-up". The conduit stub-up may enable the use of conventional conduit couplings, such as a set-screw fitting, which may sleeve over the two pieces of conduit being joined together.

Because the conventional conduit stub-up extend above the top surface of the concrete slabs, some form of protection may often be provided around conduit stub-ups to reduce the likelihood of damage to the conduit as well as injury to unaware and/or unsuspecting workers or lay people. For example, damage to the conduit may make it difficult and expensive, perhaps prohibitively so, to couple the in-slab conduit to an additional section of conduit above the slab. In addition to possible damage to the conduit itself, the conduit stub-ups extending above the concrete slab may pose a tripping, impalement, or other safety hazard. For these reasons, various approaches may be utilized to identify and/or protect the protruding conduit stub-up (and/or to protect individual from safety hazards associated with the conduit stub-up). Examples of attempted safety measures may include spraying the conduit stub-ups and supporting structure with safety orange paint, attaching flags to the conduit stub-ups, covering the conduit stub-ups with miscellaneous objects such as CMU blocks and painting the objects a safety orange, and, in situations where groupings of conduit stub-ups occur in-line with each other, wood blocking may be strapped to stub-ups in order to protect them from damage and sprayed with orange safety paint to make them more visible.

This application is directed to improvements in providing in-slab conduit connections.

SUMMARY

There is disclosed herein a conduit stub-up assembly comprising a conduit connector comprising a connector body including first and second openings for selectively receiving conduit end portions. The second opening has a threading element and is of a select diameter corresponding to a size of conduit end portions. A conduit stub-up form comprises an elongate tubular wall having a shoulder connected to a narrowed cylindrical neck closed at a distal end. The elongate tubular wall is of a diameter greater than the select diameter and the neck has a size to be removably received in the second opening and being engagable by the threading element.

It is a feature that the narrowed neck may comprise a threaded neck.

It is another feature that the conduit stub-up form may be of plastic construction wherein the neck can be inserted linearly into the second opening and removed by rotating the conduit stub-up form.

It is a further feature that the tubular wall includes an enlarged gripping head opposite the neck.

It is another feature that the conduit stub-up form may be of one piece plastic construction having a generally smooth outer surface.

It is still another feature that the conduit stub-up form may be hollow.

It is an additional feature that the neck may be threaded and the tubular wall portion may have a diameter in the range of ¾" to ⅞" greater than a diameter of the neck.

It is yet another feature that the neck has a smooth outer surface and the tubular wall portion may have a diameter in the range of ½" to ⅞" greater than a diameter of the neck.

It is still a further feature that the tubular wall may have a draft of about 1°.

It is yet an additional feature that the conduit stub-up form may have a generally uniform wall thickness of about 0.075 inches.

There is disclosed in accordance with another aspect a method of providing an in-slab conduit stub-up connection comprising: coupling a first end of a conduit connector to an in-slab conduit; coupling a tubular form with a second end of the conduit connector, the second end having a threading element, the tubular form extending above an intended slab grade; pouring a concrete slab surrounding at least a portion of the in-slab conduit in the conduit connector, the tubular form extending above the slab; and threadably removing the tubular form from the conduit connector.

Other features and advantages will be apparent from a review of the entire specification, including the appended claims and drawings.

BRIEF DESCRIPTION OF THE DRAWINGS

FIG. 1 is a perspective view of use of a conduit stub-up form in accordance with a first embodiment of the invention;

FIG. 2 is a sectional view illustrating removal of a portion of the stub-up form, in use;

FIG. 3A is a sectional view taken along the line 3A-3A of FIG. 1;

FIG. 3B is a sectional view taken along the line 3B-3B of FIG. 1;

FIG. 5 is a partial perspective view, similar to FIG. 1, illustrating removal of the conduit stub-up form;

FIG. 6 is a partial perspective view, similar to FIG. 5, illustrating installation of a conduit subsequent to removal of the conduit stub-up form;

FIG. 7 is a perspective view illustrating a conduit stub-up form assembly in accordance with another embodiment of the invention using a push on conduit connector;

FIG. 8 is a sectional view taken along the line 8-8 of FIG. 7;

FIG. 9 is a sectional view similar to FIG. 8 showing the conduit stub-up form during removal.

FIG. 10 is a sectional view similar to FIG. 9 illustrating insertion of a plug after removal of the stub-up form;

DETAILED DESCRIPTION

Figure 4:
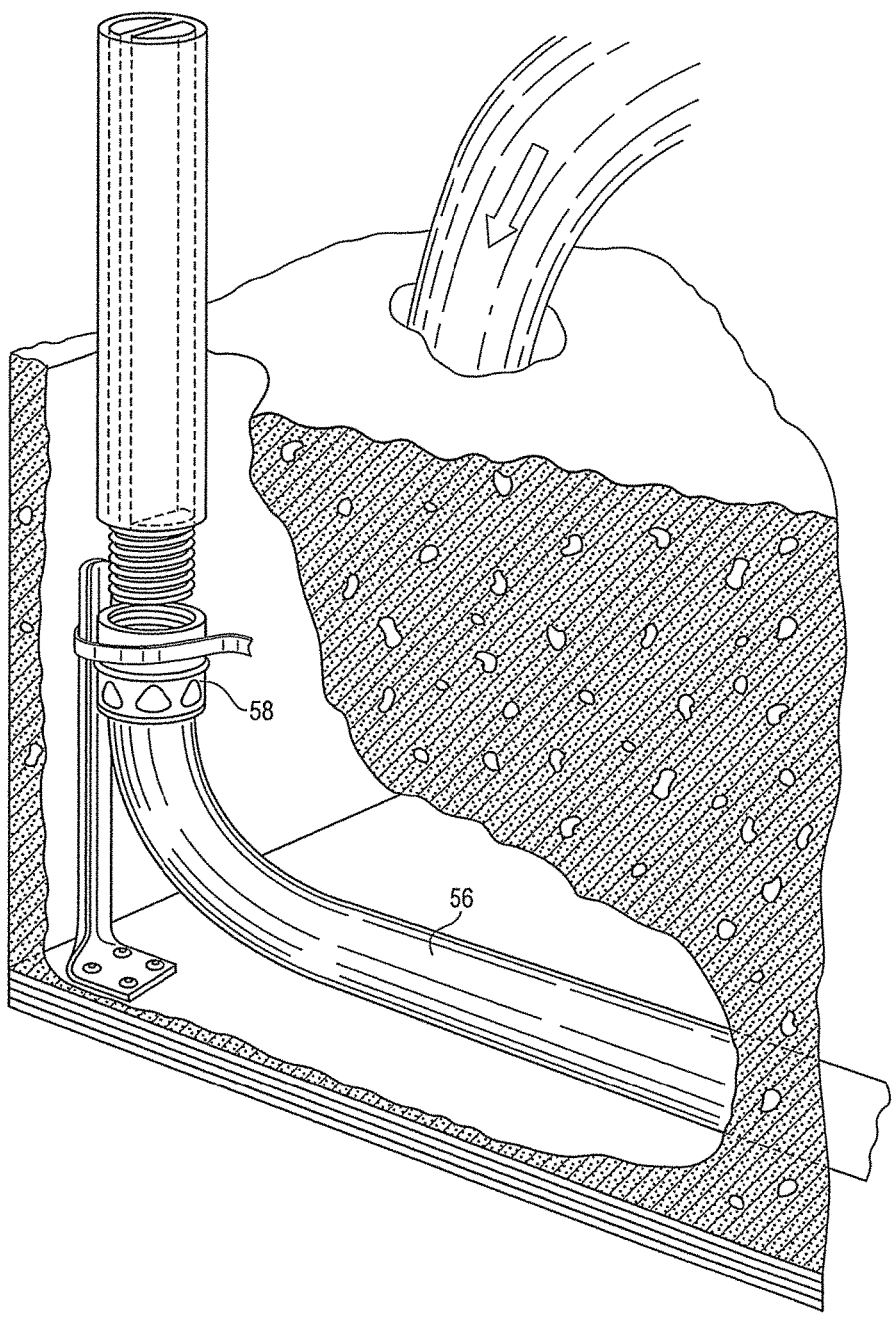
FIG. 4 is a perspective view, similar to FIG. 1, illustrating a different conduit configuration.

The potential problems and hazards associated with conduit or raceway stub-ups protruding above a concrete slab, or other surface, may be at least partially, and/or completely alleviated by eliminating and/or reducing the conduit stub-up. In some embodiments, eliminating and/or reducing the conduit stub-up may be accomplished while allowing two sections of conduit (e.g., a section of conduit disposed at least partially below the finish elevation of the concrete slab and a section of conduit to extend upwardly out from the concrete slab) to be joined or coupled together at least partially within the body of the concrete slab. In some embodiments, the coupling of the two conduit/raceway sections may be accomplished after the placement of the concrete and, in some situations, the two conduit sections may be coupled no sooner than a time when the vertical raceway element can be completely obstructed by partitions. In an embodiment, the present disclosure may allow a chase, or opening to be created into the surface of the concrete slab and extending down to an embedded coupling within the body of the slab. A section of conduit may be inserted into the chase, down to the coupling, and coupled to the embedded conduit via the coupling, at a point in time when partitions are being installed in the sequence of construction, thus eliminating any potential damage to the embedded conduit and remove any trip or impalement safety issues extending above top of slab elevation.

As shown in the accompanying drawings, a push-on connector or threaded connector may be attached to a section of conduit that will be below the final grade of a concrete slab. Attaching the connector to the section of conduit may include attaching the connector to a run of conduit that has a 90 degree bend in it (e.g., so that the end of the 90 degree bend may be pointing generally vertically upward), or may include providing the connector on a short piece of conduit that has a 90 degree bend in it, which can be attached to a horizontal run of conduit that will be buried, or embedded, in the slab once the slab is poured. According to either such situation, or other similarly suitable configurations, a generally vertically oriented connector may be provided (although in other embodiments, the connector could be horizontally oriented or oriented at an angle, if that is the desired direction of the run of conduit that will be added after the slab is poured).

In general, a stub-up form may include a sleeve, tube, or other body that may be coupled to the connector and may extend upwardly from the connector to a height that may be above the intended final grade or elevation of the concrete slab that is to be poured. In an embodiment, the stub-up form may be about 6 inches tall, to accept any generally standard variations in concrete slab thickness. However, the height of the stub-up form may vary depending, for example, on an intended thickness of the concrete slab and a general depth of the connector within the intended concrete slab. As generally mentioned, the stub-up form may be of sufficient height to extend above the surface of the concrete slab once poured.

The connector may include a metal body or sleeve, that may provide an electrical connection between the section of conduit buried in the concrete slab and the section of conduit inserted through the opening in the concrete slab created by the stub-up form. This electrical connection may provide a continuous ground between the new piece of conduit and the conduit buried in the slab.

Example embodiments of a conduit stub-up arrangement may include one or more of the features set forth below. A push-on/push-in conduit connector (herein commonly referred to as "push-on" conduit connector) may be attached to a piece of conduit to be embedded/buried in a concrete slab. A bottom end of the stub-up form/sleeve/tube may be pushed into the other end of the push-on connector so the stub-up form extends above the intended top of the slab to be poured. The stub-up form has sufficient mechanical strength to resist the rigors of concrete placement and finishing operations—e.g., without breaking or becoming displaced. The form may include a gasket or O-ring to seal against the connector to further protect against concrete or water/moisture seeping into the connector or raceway. The stub-up form may have a smooth surface (e.g., plastic such as HDPE) to prevent concrete from bonding to the stub-up form. The stub-up form may be slightly tapered to make it easier to pull out of the slab after the concrete sets. The top of the stub-up form may include a hexagonal, square, etc. shape at a point that will be above the slab. This allows a wrench, etc., to be used to twist the stub-up form to screw it out of the push-on conduit connector.

Once the stub-up form is attached to the piece of conduit raceway that is to be buried in the slab, it may be attached to a separate supporting device that is attached to formwork, metal deck or embedded in subgrade to support the entire system during the placement of concrete until concrete is cured and sleeve (by itself) is removed from the cured concrete to leave behind a chase or raceway for the final conduit extension to be inserted through into the connector.

After the concrete slab is poured (with the top of the stub-up connector sticking above the top surface) and hardens, the stub-up form can be removed from the concrete slab (e.g., by twisting the stub-up form out of the connector to leave a hole going down into the concrete slab and the conduit connector buried in the slab. The hole could be about the same diameter as the outside diameter of a piece of conduit or larger. A piece of conduit can be inserted through the hole in the concrete slab and secured to the connector to create a continuous conduit run extending from the buried piece of conduit and the buried conduit connector.

After the stub-up form is removed and before it is time to install the piece of conduit sticking up out of the slab, a plug could be put in/over the hole to keep debris out of the hole. This cap could be a part of the overall stub-up form that could be detached by only being perforated to the top of the form and detached at the same time as removing the form and then inserted into the top of the concrete hole.

Without anything sticking up from the slab (before the next piece of conduit is attached) tripping, falling and/or impalement hazards might be reduced eliminated, while still allowing further pieces of conduit to be attached to provide continuous conduit runs that go into the slab.

In general, implementations of the present disclosure provide conduit stub-up arrangements that allow in-slab conduit raceway sections to be coupled with conduit raceway sections extending above the slab. In some implementations, the conduit stub-up arrangements may reduce, or eliminate, any features extending above the surface of the concrete slab prior to the point in time at which the above-slab conduit sections are coupled with the in-slab conduit sections. By reducing, or eliminating, features extending above the top surface of the concrete slab, the potential for damage to the conduit raceway (also referred to herein as "conduit"), which could make it difficult and/or expensive to join the damaged conduit raceway to additional conduit raceway section, may also be reduced and/or eliminated. As such, in some embodiments, the potential time and/or expense associated with repairing damaged conduit stub-ups may be reduced and/or eliminated. Similarly, by reducing, or eliminating, features extending above the top surface of the concrete slab, the potential tripping, impalement, or other safety hazards may also be reduced and/or eliminated.

The conduit stub-up form is used with an associated conduit connector in connection with electrical conduit on a building deck during construction and prior to pouring of concrete. The deck may include several conduit raceways each turned upwardly to a conduit connector. Prior to pouring the conduit, a stub-up form is removably secured to the connector. After the concrete is poured and hardens, then the stub-up form is removed leaving an opening through which a conduit can be inserted at the appropriate time during the building electrical construction phase.

FIG. 1 illustrates a conduit stub-up form assembly 20 in accordance with one embodiment. This is shown in exploded fashion for connection to a horizontal conduit run 22 having a straight on connector 24 with a threaded end 26. The conduit stub-up form assembly comprises a low profile or short radius 90 degree elbow 28 and a removable stub-up form 30.

The 90 degree elbow 28 is produced out of a conductive metal such as zinc or aluminum with a standard sweeping radius for approx. 45 degrees with the remaining 45 degrees being crimped at a single joint to complete the 90 degree bend. This type of bend allows for larger diameter conduit to maintain the coupled joint within the shallow depths of the concrete slab. The elbow 28 has a first threaded opening 28A at one end and a second threaded opening end 28B at an opposite end. A round flange 32 surrounds the second opening 28B, on the end closest to the top of concrete, with slots 34 to receive a support standee 36 anchored to a form work/substrate 38. The first threaded opening 28A is threadably connected to the connector 24.

The stub-up form 30, see also FIG. 3B, comprises a hollow plastic cylindrical body 40 formed by an elongate tubular wall 42 having a shoulder 44 connected to a narrowed cylindrical threaded neck 46 closed at a distal end by an end wall 48. The size of the threaded neck 46 is adapted to be received in the second threaded opening 28B of the elbow 28. This could be sized for ¾ conduit or any other size conduit, as necessary. A cross piece, defined by a central interior wall 50, extends across the hollow cylindrical body 40 to aid in removal of the form 30, as described below.

The stub-up form 30 may be formed of one piece plastic construction so that it is light weight, inexpensive to produce and disposable. The tubular wall may include a draft of about 1° and a generally uniform wall thickness of about 0.075 inches. As will be apparent, the invention is not specifically limited to such a draft or wall thickness.

In use, the stub-up form 30 is removably secured to the elbow 28 by threading the neck 46 into the second threaded opening 28B. Subsequent to assembly of all the parts, the concrete slab S is poured as illustrated at C in FIG. 1. Once the concrete slab S hardens, then the stub-up form 30 above the slab S can be cut off as illustrated in FIG. 2 to expose a remaining part of the stub-up form 30 which is illustrated in cross-section in FIG. 3A. The cutoff stub-up form 30 can remain to prevent debris from falling into the raceway. Prior to installing a conduit, the stub-up form 30 can be removed from the concrete slab using pliers P or the like to aid in turning the form, as illustrated in FIG. 5, to unthread the form 30 from the second threaded opening 28B. Thereafter, a conduit 52 with a threaded connector 54 is inserted into the hole in the concrete and into the elbow second opening 28B, as shown in FIG. 6. As will be apparent, the diameter of the stub-up form 30, above the shoulder, is slightly larger than the size of the conduit end connector 54 to allow insertion of the same.

The threaded design of the stub-up form 30 allows for the use of both EMT (thin-wall non-threaded conduit) as well as RMC (heavy-wall threaded conduit). EMT itself is not threaded, but can be used with threaded fittings or adapters The threaded stub-up form 30 can be coupled onto the end of a standard bent radius EMT conduit raceway that is embedded in concrete using a standard compression coupling with a threaded female end to receive the plastic sleeve insert that will allow for future access of the conduit raceway. FIG. 4 illustrates use of the same stub-up form 30 with such a conduit raceway 56 having a bend and ending in a threaded connector 58. As such, a stub-up form assembly comprises the form 30 and the connector 58. In all other respects, the stub-up form 30 operates similar to that discussed above relative to FIG. 1. In slab-on-grade applications where RMC conduit is used the threaded connection could be used to eliminate the separate fitting.

The stub-up form 30 may be manufactured of different sizes according to the size of the conduit used in the raceway. Moreover, the tubular wall 40 may be of a diameter greater than the threaded neck 46 which is of a size to be removably received in the connector second opening 28B. The tubular wall 40 being of a larger size provides a larger opening than the conduit size to provide space for the conduit and any connectors to be received in the resulting opening and also prevents concrete from getting into the connector opening 28B. The outer diameter of the tubular wall may be in the range of ¾" to ⅞" greater than the diameter of the neck 46. The invention is not intended to be limited to any particular size relationship.

FIGS. 7-11, 12A and 12B illustrate an alternative embodiment. In this embodiment, a conduit stub-up form assembly 60 includes a conduit stub-up form 62 and a push-on second connector 64B. The push on second connector 64B is provided on an elbow 64 with an opposite first connector 64A.

Figure 12A:
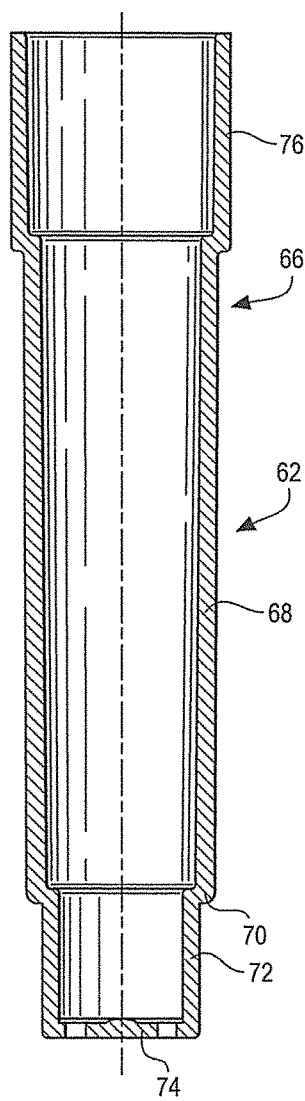
FIG. 12A is a sectional view of the conduit stub-up form used with the embodiment of FIG. 7.

Referring to FIG. 12A, the conduit stub-up form 62 comprises a hollow cylindrical body 66 formed by a tubular wall 68 having a shoulder 70 connecting to a neck 72 closed a distal end by an end wall 74. An enlarged head 76 is provided opposite the neck 72 and is configured in the form of a hexagonal nut, as shown in FIG. 7. The form 62 is of plastic construction having a generally smooth outer surface. The tubular wall portion 68 may have a diameter in a range of ½" to ⅞" greater than a diameter of the neck 72. The tubular wall 68 may have a draft of about 1° and a generally uniform wall thickness of about 0.075 inches.

Figure 12B:
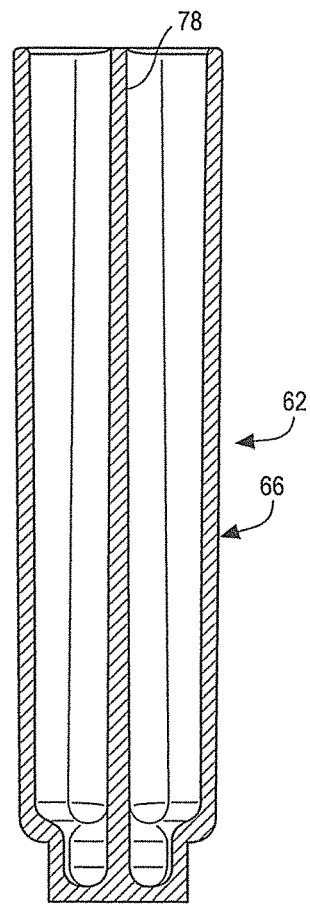
FIG. 12B is a sectional view, similar to that in FIG. 12A, of a conduit stub-up form including a central interior wall to aid in removal of the conduit stub-up form.

As shown in FIG. 12B, the conduit stub-up form 62 may include a cross piece defined by a central interior wall 78, as with the embodiment of FIG. 3B, in the hollow cylindrical body 66 to aid in removal of the form 62, as above.

In this embodiment, the second connector 64B may comprise a push-on connector such as manufactured by Bridgeport Fittings which includes a threading element in the form of a grab ring 80, see FIG. 9, for removably receiving the stub-up form 62 and subsequently the conduit 52. The grab ring 80 has teeth extending inwardly and turned slightly downward. The teeth form a helix or spiral. Consequently, the stub-up form 62 can be inserted into the connector by pushing the stub-up form straight in.

After the concrete is poured, see FIG. 8, then the stub-up form 62 is removed by turning the stub-up form 62, see FIG. 9. The helical grab ring 80 in essence "unthreads" the stub-up form 62, without the use of actual threads molded in the neck 72. However, the teeth may dig into the neck 72 to form threads, as shown in FIG. 9.

Figure 11:
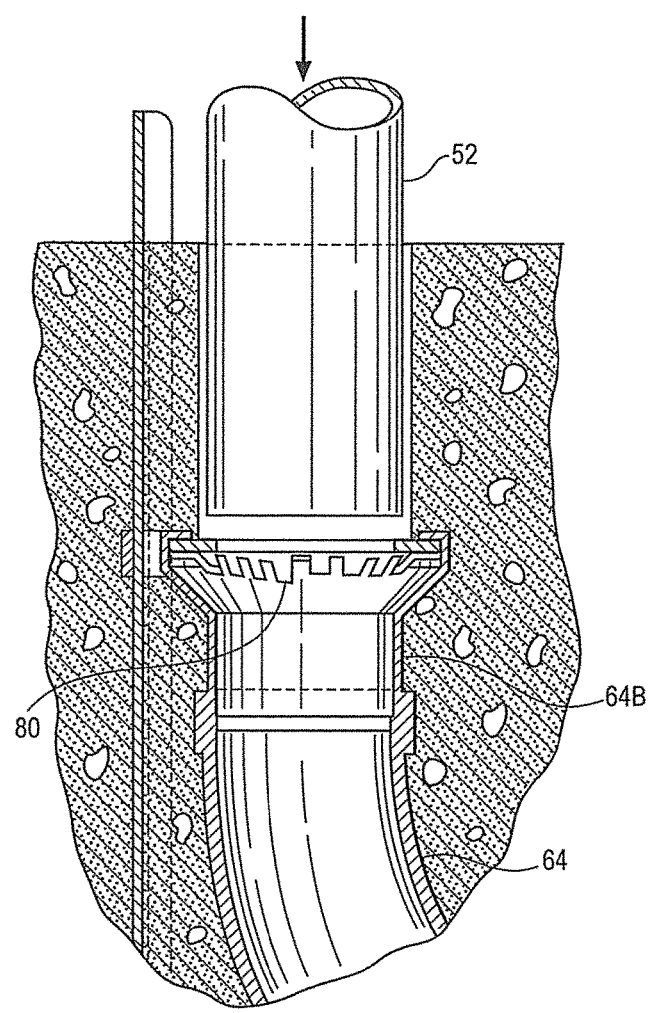
FIG. 11 is a sectional view, similar to FIG. 9, illustrating insertion of a conduit.

After removal of the stub-up form 62, then a plug 82 may be temporarily inserted into the opening in the concrete to keep debris out, as shown in FIG. 10. Thereafter, a conduit 52 may be inserted by pushing it into the connector 64B to be held by the grab ring 80, as shown in FIG. 11.

With each of the embodiments described herein, a one piece, plastic stub-up form is used which can be temporarily secured to a conduit connector prior to pouring a deck. After the deck is poured and the concrete is hardened, then the stub-up form can be removed by unthreading the same, as discussed, to be subsequently replaced by a conduit including a threaded connector or using a grab ring connector, as described.

Moreover, these embodiments disclose a method of providing an in-slab conduit stub-up connection which comprises coupling a first end of a conduit connector to an in-slab conduit. A tubular form is coupled with a second end of the conduit connector, the second end having a threading element. The tubular form extends above an intended slab grade. A concrete slab is poured surrounding at least a portion of the in-slab conduit and the conduit connector, with the tubular form extending above the slab. The tubular form is then threadably removed from the conduit connector.

In accordance with the methodology described herein, when used with a push-on connector, the stub-up form could include any sort of tube, pipe or standard tube shape, inclusive of conduit directly, which is threadably removed from the push-on connector after the slab is poured.

FIGS. 13-16 illustrate an adjustable coupling embodiment. In this embodiment all parts are metallic in composition to maintain continuity. This system allows the raceway to be set flush with the top of concrete elevation with little to no comeback until such time that the walls are laid out and ready for the vertical continuation of the metallic raceway (either EMT or RMC).

Figure 13:
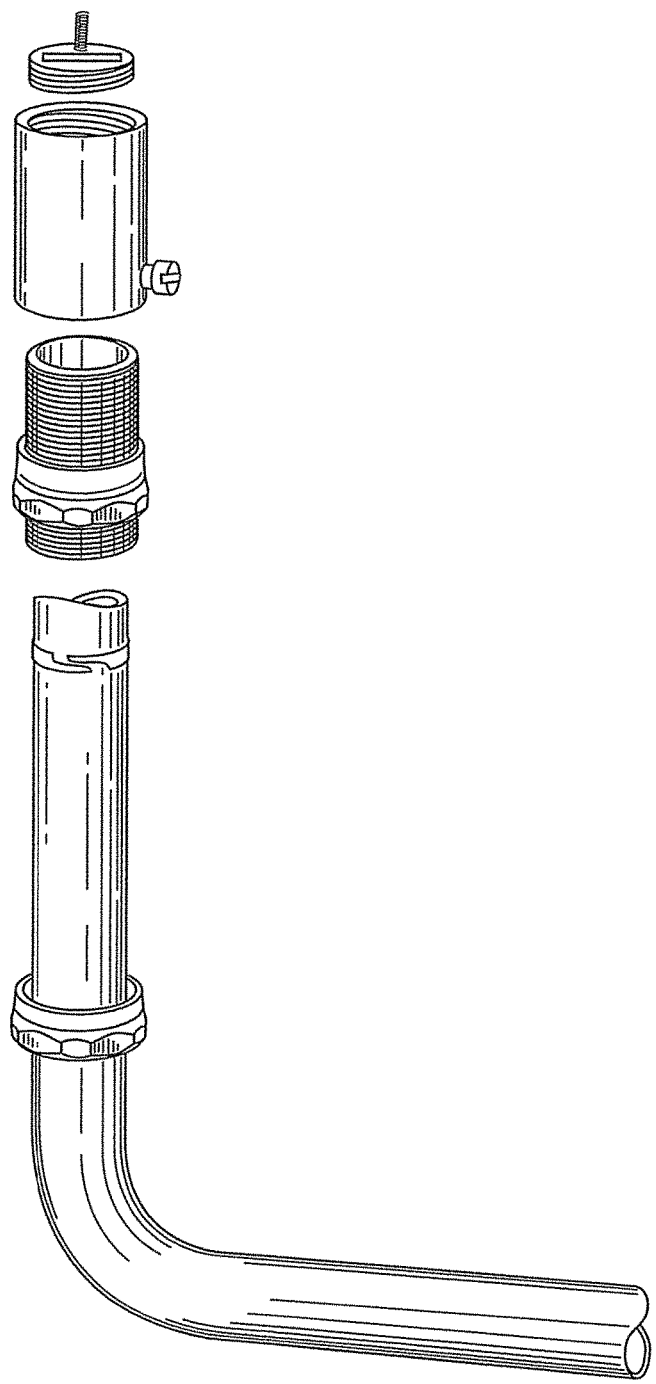
FIGS. 13-16 illustrate an adjustable coupling embodiment of a stub-up application.

FIG. 13 is an exploded view of the entire system. Starting from the top down the first part would be described as a flanged closure plug with a flexible spring pendent that can be hit or knocked down and return to an upright position. This will allow the entire assembly to be located even if the closure plug gets covered with concrete crème or slurry during the finishing process. The intent would be that this part would protect the threaded coupling and able to be removed in the future in order to allow access for the future extension of the vertical metallic raceway (either EMT or RMC). It would also be standard that this part as well as the coupling that it is threaded into would always be set to be flush with the final top of concrete elevation.

The next piece is similar to a standard threaded coupling modified to have a set screw fitting at the bottom to allow this part to be tightened down to the male threads of the adjustment shaft that it is threaded into below it. These two parts work in unison with one another and vary in height by approximately ½" to allow the threaded female coupling to be fully tightened down with enough room for the closure plug to be seated flush with the top of the female threaded coupling or further extension of the raceway. This part can then be adjusted in elevation approximately the full height of the male threads for which it is adjoined. For example this male threaded adjustment shaft would be approximately 1½" and the female threaded coupling would be approximately 2" in height leaving approximately ½" for the closure plug to be seated or threaded conduit to be inserted. This configuration would allow approximately 1½" of adjustment for the female threaded coupling to be leveled with the top of concrete elevation in order to maintain a perfectly flush trip free connection.

Figure 14:
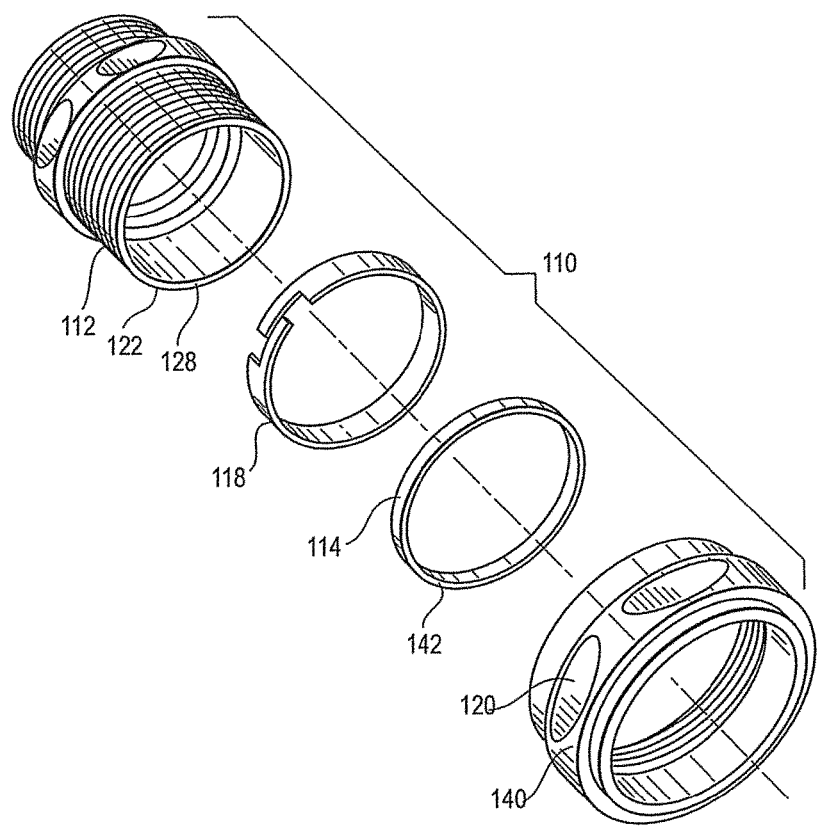

The next part, see FIG. 14, is similar to a compression connector fitting except that the top end of the male thread is extended to allow for maximum adjustment that the female threaded coupling can maneuver along. By eliminating the clamping ring (118), waterproof gasket (114 & 142) and the tightening nut (120 & 140) the lower threads (112) can also be screwed into the short radius elbow as depicted in FIG. 2 of 3.

Figure 15:
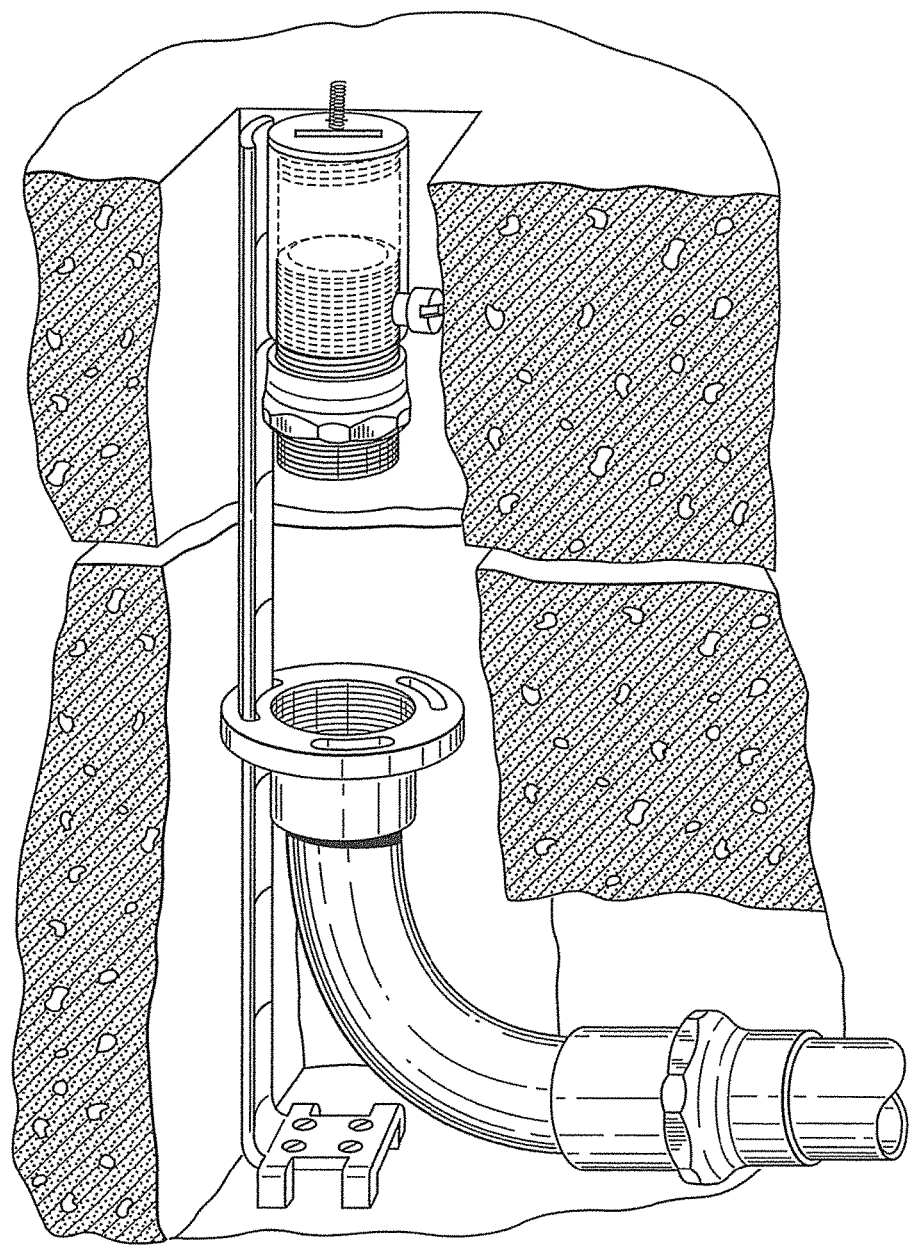

FIG. 15 shows the system being used with a short radius elbow and has the following original components from the previous definitions or explanations. The short radius elbow allows for the use of either EMT conduit with the use of transitional fittings as well as RMC (Rigid Metallic Conduit). This elbow has a flanged end with oblong knock outs to allow the standee support piece to slip through for support and a tie off point. The standee has incremental marks measured for elevation from top of the deck as well as being crimped to allow them to be bent and broke off at specific intervals. There are legs on the standee to allow for concrete to get underneath them in order for them not to be visible on the underside of the deck once it has been stripped. The screw holes allow it to be tightened down to the supporting deck.

Figure 16:
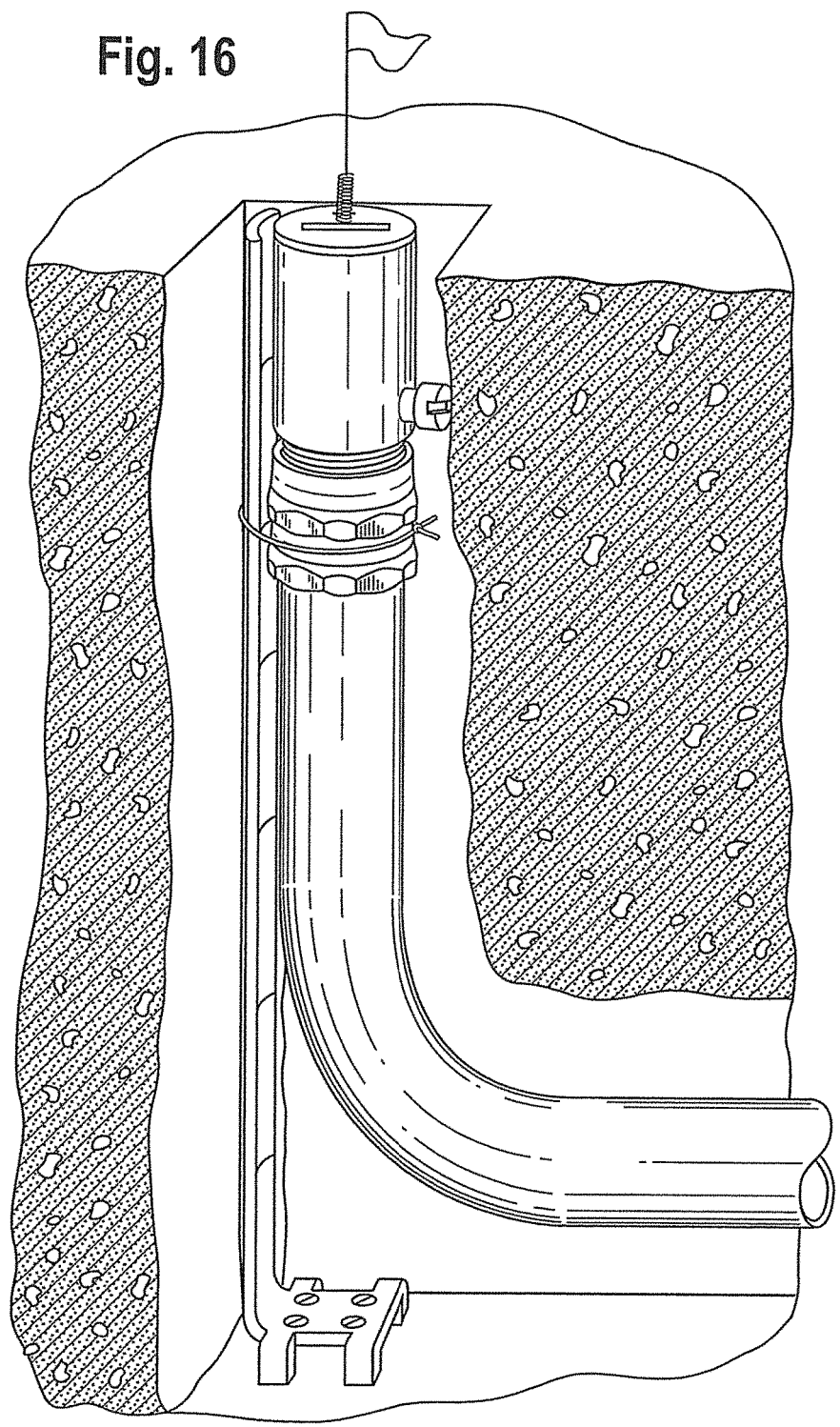

FIG. 16 shows the system being used on an EMT conduit with a standard or tight radius 90 degree bend. This combination is being tied to the support standee using standard tie wire between the tightening nuts of the compression fitting.

As noted, the stub-up form may be adapted for different sizes of conduit, as necessary or desired. Likewise, the fittings and elbows and the like, would be appropriately sized for the conduit being used.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A method of providing an in-slab conduit stub-up connection comprising:
    coupling a first end of a conduit connector to an in-slab conduit;
    coupling a tubular form with a second end of the conduit connector, the second end having a threading element, the tubular form extending above an intended slab grade;
    pouring concrete to form a slab surrounding at least a portion of the in-slab conduit and the conduit connector, the tubular form extending above the slab; and
    threadably removing the tubular form from the conduit connector.

2. The method of claim 1, wherein the tubular form comprises an elongate tubular wall having a shoulder connected to a narrowed cylindrical neck closed at a distal end, the elongate tubular wall being of a diameter greater than the neck, the neck having a size to be removably received in the second end and being engagable by the treaded element.

3. The method of claim 1, wherein the tubular form is of plastic construction and wherein coupling the tubular form with the second end of the conduit connector comprises inserting the form linearly into the second end and wherein threadably removing the tubular form from the conduit connector forms threads in the tubular form.

4. The method of claim 2, wherein the neck comprises a threaded neck.

5. The method of claim 1, wherein the tubular form is of one piece plastic construction having a generally smooth outer surface.

6. The method of claim 1, wherein the tubular form is hollow.

7. The method of claim 1, wherein the tubular form has a draft of about 1° to aid in removing the tubular form.

* * * * *